US012586147B2

(12) United States Patent
Yang et al.

(10) Patent No.: US 12,586,147 B2
(45) Date of Patent: Mar. 24, 2026

(54) IMAGE PROCESSING METHOD AND IMAGE PROCESSING APPARATUS FOR TRANSFORMING OBJECTS WITHIN AN IMAGE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Mei Yang, Beijing (CN); Fangru Zhou, Beijing (CN); Shan An, Beijing (CN)

(73) Assignees: BEIJING WODONG TIANJUN INFORMATION TECHNOLOGY CO , LTD., Beijing (CN); BEIJING JINGOONG CENTURY TRADING CO., LTD., Beijing (CN)

( * ) Notice: Subject to any disclaimer, the term of this patent is extended or adjusted under 35 U.S.C. 154(b) by 323 days.

(21) Appl. No.: 18/263,005

(22) PCT Filed: Jan. 4, 2022

(86) PCT No.: PCT/CN2022/070055
§ 371 (c)(1),
(2) Date: Jul. 26, 2023

(87) PCT Pub. No.: WO2022/166506
PCT Pub. Date: Aug. 11, 2022

(65) Prior Publication Data
US 2024/0087079 A1 Mar. 14, 2024

(30) Foreign Application Priority Data

Feb. 7, 2021 (CN) .......................... 202110175113.5

(51) Int. Cl.
*G06T 3/02* (2024.01)
*G06T 7/11* (2017.01)
(Continued)

(52) U.S. Cl.
CPC .................. *G06T 3/02* (2024.01); *G06T 7/11* (2017.01); *G06T 7/13* (2017.01); *G06T 7/187* (2017.01); *G06T 2207/20224* (2013.01)

(58) Field of Classification Search
CPC ..... G06T 3/02; G06T 7/11; G06T 7/13; G06T 7/187; G06T 2207/20224; G06T 11/00; G06T 7/12; G06T 7/33
See application file for complete search history.

(56) References Cited

U.S. PATENT DOCUMENTS

2011/0128398 A1 6/2011 Shimodaira
2012/0201423 A1 8/2012 Onai et al.
(Continued)

FOREIGN PATENT DOCUMENTS

CN 102098476 A 6/2011
CN 102656605 A 9/2012
(Continued)

OTHER PUBLICATIONS

Shafii, M., SID-Ahmed, M. Skew detection and correction based on an axes-parallel bounding box. IJDAR 18, 59-71 (2015). https://doi.org/10.1007/s10032-014-0230-y. (Year: 2015).*
(Continued)

*Primary Examiner* — Vincent Rudolph
*Assistant Examiner* — Keely Gwynne Yeargin
(74) *Attorney, Agent, or Firm* — Myers Bigel, P.A.

(57) ABSTRACT

The present disclosure provides an image processing method and an image processing apparatus. The image processing method including: performing line detection on a boundary of an object in a scene image to obtain a plurality of
(Continued)

91 candidate lines; taking one of the plurality of the candidate lines, which has the largest number of pixels overlapping with the boundary, as a first reference line; generating a minimum bounding rectangle of the object in the scene image; generating a transformed area, wherein each of four vertexes of the minimum bounding rectangle is on one of four sidelines of the transformed area; transforming a preset image into the transformed area to generate a transformed image; and overlaying the object with the transformed image to update the scene image.

18 Claims, 9 Drawing Sheets

(51) Int. Cl.
*G06T 7/13*        (2017.01)
*G06T 7/187*       (2017.01)

(56)                References Cited

U.S. PATENT DOCUMENTS

| | | | |
|---|---|---|---|
| 2013/0033618 A1 | 2/2013 | Kato et al. | |
| 2013/0101170 A1 | 4/2013 | Park et al. | |
| 2016/0343142 A1* | 11/2016 | Gaiha | G06T 7/181 |
| 2018/0137654 A1* | 5/2018 | Sasaki | G06T 11/60 |

FOREIGN PATENT DOCUMENTS

| | | | | |
|---|---|---|---|---|
| CN | 102915534 A | 2/2013 | | |
| CN | 107240068 A | 10/2017 | | |
| CN | 109949211 A | 6/2019 | | |
| CN | 110738604 A | 1/2020 | | |
| CN | 111292337 A | 6/2020 | | |
| CN | 111639642 A | 9/2020 | | |
| CN | 111783524 A | 10/2020 | | |
| CN | 112235520 A | 1/2021 | | |
| CN | 113763439 A | 12/2021 | | |
| JP | H10312460 A | 11/1998 | | |
| JP | 2004164479 A | 6/2004 | | |
| JP | 2008167009 A | 7/2008 | | |
| JP | 2013037411 A | 2/2013 | | |
| JP | 2016200533 A | * 12/2016 | | |
| JP | 2020086593 A | 6/2020 | | |
| KR | 20140112891 A | * 9/2014 | | G06T 11/00 |

OTHER PUBLICATIONS

"Communication with Supplementary European Search Report", EP Application No. 22748785.7, Nov. 21, 2024, 5 pp.

Jia, et al., "Geometric Sensing of Known Planar Shapes", The International Journal of Robotics Research, vol. 15, No. 4, Aug. 1996, pp. 365-392.

Naumann, et al., "Refined Plane Segmentation for Cuboid-Shaped Objects by Leveraging Edge Detection", arXiv:2003.12870v1 [cs. CV], retrieved from https://arxiv.org/abs/2003.12870v1, Mar. 28, 2020, 3 pp.

Shafii, et al., "Skew detection and correction based on axes-parallel bounding box", International Journal on Document Analysis and Recognition (IJDAR), vol. 18, No. 1, Oct. 1, 2014, pp. 59-71.

"Notice of First Review Opinion and English language translation", CN Application No. 202110175113.5, Jul. 19, 2024, 14 pp.

"International Search Report and English language translation", International Application No. PCT/CN2022/070055, Mar. 30, 2022, 6 pp.

* cited by examiner

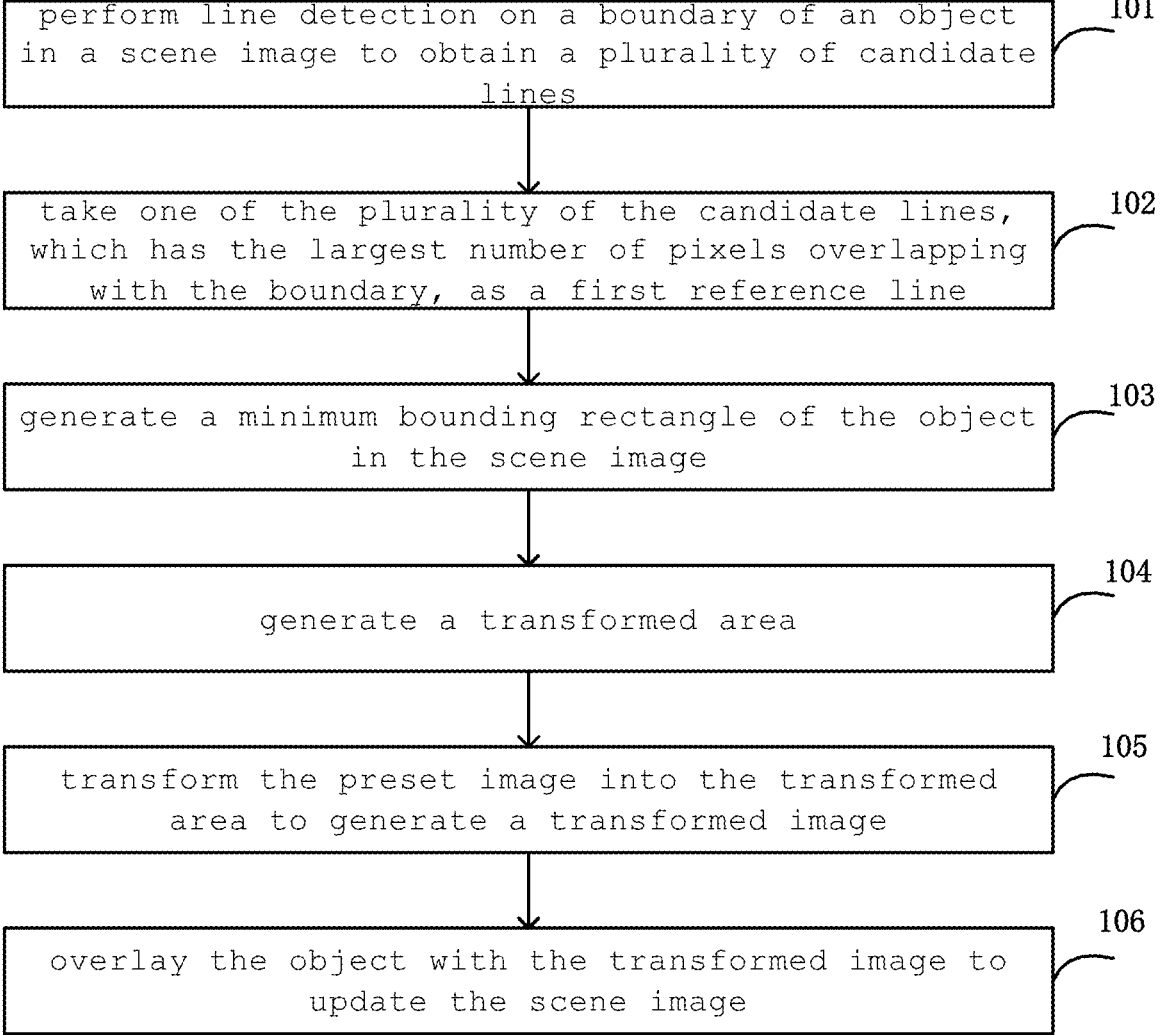

perform line detection on a boundary of an object in a scene image to obtain a plurality of candidate lines — 101 take one of the plurality of the candidate lines, which has the largest number of pixels overlapping with the boundary, as a first reference line — 102 generate a minimum bounding rectangle of the object in the scene image — 103 generate a transformed area — 104 transform the preset image into the transformed area to generate a transformed image — 105 overlay the object with the transformed image to update the scene image — 106

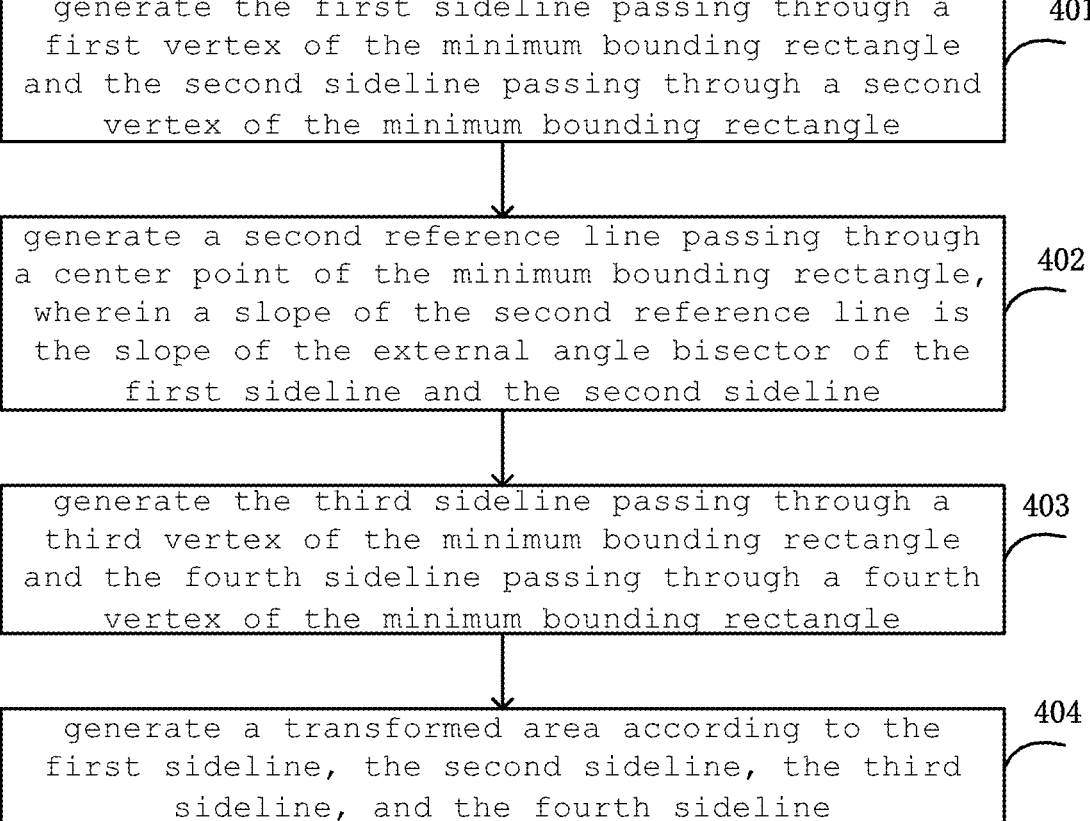

generate the first sideline passing through a
first vertex of the minimum bounding rectangle
and the second sideline passing through a second
vertex of the minimum bounding rectangle    401 generate a second reference line passing through
a center point of the minimum bounding rectangle,
wherein a slope of the second reference line is
the slope of the external angle bisector of the
first sideline and the second sideline    402 generate the third sideline passing through a
third vertex of the minimum bounding rectangle
and the fourth sideline passing through a fourth
vertex of the minimum bounding rectangle    403 generate a transformed area according to the
first sideline, the second sideline, the third
sideline, and the fourth sideline    404

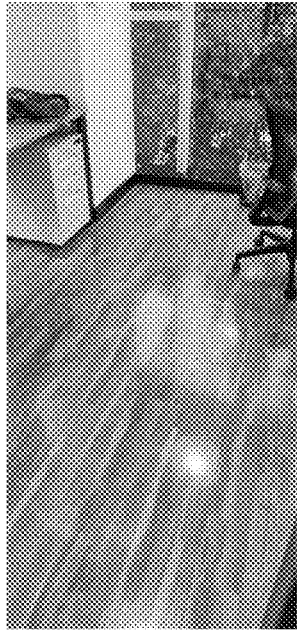
FIG. 11A          FIG. 11B
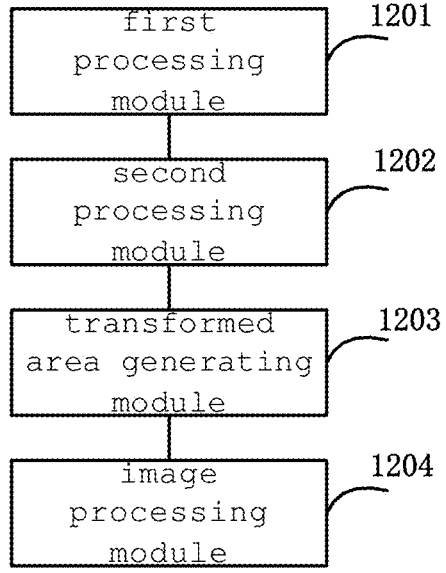
FIG. 12

IMAGE PROCESSING METHOD AND IMAGE PROCESSING APPARATUS FOR TRANSFORMING OBJECTS WITHIN AN IMAGE

CROSS-REFERENCE TO RELATED APPLICATIONS

The present application is a U.S. National Stage application under 35 U.S.C. § 371 of International Patent Application No. PCT/CN2022/070055, filed on Jan. 4, 2022, which itself is based on and claims priority from CN application No. 202110175113.5, filed on Feb. 7, 2021, the disclosures of both of which are hereby incorporated herein by reference in their entireties into the present application.

TECHNICAL FIELD

The present disclosure relates to the field of information processing, and in particular, to an image processing method and an image processing apparatus.

BACKGROUND

At present, image display is widely used as means of propaganda. For example, the user experience can be effectively improved by displaying objects such as flooring, carpets and the like in different decoration scenes.

SUMMARY

According to a first aspect of an embodiment of the present disclosure, there is provided an image processing method, comprising: performing line detection on a boundary of an object in a scene image to obtain a plurality of candidate lines; taking one of the plurality of the candidate lines, which has the largest number of pixels overlapping with the boundary, as a first reference line; generating a minimum bounding rectangle of the object in the scene image; generating a transformed area, wherein each of four vertexes of the minimum bounding rectangle is on one of four sidelines of the transformed area, a slope of a first sideline and a slope of an second sideline opposite to the first sideline of the transformed area are determined by a slope of the first reference line, and a slope of a third sideline and a slope of an fourth sideline opposite to the third sideline of the transformed area are determined by a slope of an exterior angle bisector of the first sideline and the second sideline; transforming a preset image into the transformed area to generate a transformed image; and overlaying the object with the transformed image to update the scene image.

In some embodiments, the generating the transformed area comprises: generating the first sideline passing through a first vertex of the minimum bounding rectangle and the second sideline passing through a second vertex of the minimum bounding rectangle, wherein an angle where the first vertex is located and an angle where the second vertex is located are opposite angles, a difference between the slope of the first sideline and the slope of the first reference line and a difference between the slope of the second sideline and the slope of the first reference line are within a first preset range; generating a second reference line passing through a center point of the minimum bounding rectangle, wherein a slope of the second reference line is the slope of the external angle bisector of the first sideline and the second sideline; generating the third sideline passing through a third vertex of the minimum bounding rectangle and the fourth sideline passing through a fourth vertex of the minimum bounding rectangle, wherein an angle where the third vertex is located and an angle where the fourth vertex is located are opposite angles, a difference between the slope of the third sideline and the slope of the second reference line and a difference between the slope of the fourth sideline and the slope of the second reference line are within a second preset range; and generating the transformed area according to the first sideline, the second sideline, the third sideline and the fourth sideline.

In some embodiments, the slope of the first sideline is greater than the slope of the first reference line and the slope of the second sideline is less than the slope of the first reference line in a case where the slope of the first reference line is less than 0.

In some embodiments, the slope of the first sideline is less than the slope of the first reference line and the slope of the second sideline is greater than the slope of the first reference line in a case where the slope of the first reference line is greater than 0.

In some embodiments, the difference between the slope of the first sideline and the slope of the first reference line is a ratio of a distance from the first vertex to the first reference line to a first preset parameter; the difference between the slope of the second sideline and the slope of the first reference line is a ratio of a distance from the second vertex to the first reference line to a second preset parameter.

In some embodiments, the slope of the third sideline is less than the slope of the second reference line and the slope of the fourth sideline is greater than the slope of the second reference line in a case where the slope of the second reference line is greater than 0.

In some embodiments, the slope of the third sideline is greater than the slope of the second reference line and the slope of the fourth sideline is less than the slope of the second reference line in a case where the slope of the second reference line is less than 0.

In some embodiments, the difference between the slope of the third sideline and the slope of the second reference line is a ratio of a distance from the third vertex to the second reference line to a third preset parameter; the difference between the slope of the fourth sideline and the slope of the second reference line is a ratio of a distance from the fourth vertex to the second reference line to a fourth preset parameter.

In some embodiments, the transforming a preset image into the transformed area to generate a transformed image comprises: generating a minimum bounding rectangle of the transformed area; splicing repeatedly the preset image in the minimum bounding rectangle of the transformed area to generate a sample image; transforming the sample image into the transformed area by affine transformation to generate a transformed image.

In some embodiments, the method further comprising: deleting portions of the transformed image beyond the scene image after overlaying the object with the transformed image.

According to a second aspect of an embodiment of the present disclosure, there is provided an image processing apparatus comprising: a first processing module configured to perform line detection on a boundary of an object in a scene image to obtain a plurality of candidate lines, and take one of the plurality of the candidate lines, which has the largest number of pixels overlapping with the boundary, as a first reference line; a second processing module configured to generate a minimum bounding rectangle of the object in the scene image; a transformed area generating module configured to generate a transformed area, wherein each of four vertexes of the minimum bounding rectangle is on one of four sidelines of the transformed area, a slope of a first sideline and a slope of an second sideline opposite to the first sideline of the transformed area are determined by a slope of the first reference line, and a slope of a third sideline and a slope of an fourth sideline opposite to the third sideline of the transformed area are determined by a slope of an exterior angle bisector of the first sideline and the second sideline; an image processing module configured to transform a preset image into the transformed area to generate a transformed image, and overlay the object with the transformed image to update the scene image.

According to a third aspect of the embodiments of the present disclosure, there is provided an image processing apparatus comprising: a memory; and a processor coupled to the memory, which is configured to execute the image processing method of any one of the embodiments described above on a basis of instructions stored in the memory.

According to a fourth aspect of the embodiments of the present disclosure, there is provided a non-transitory computer readable storage medium which stores computer instructions that, when executed by a processor, implement the method of any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to illustrate the embodiments of the present disclosure or the technical solutions in the prior art more clearly, the drawings used in the embodiments or the description of the prior art will be briefly described below, it is obvious that the drawings in the following description are only some embodiments of the present disclosure, and for those skilled in the art, other drawings may be obtained according to the drawings without inventive effort.

FIG. 1 is a schematic flowchart of an image processing method according to one embodiment of the present disclosure;

FIG. 4 is a schematic flowchart of an image processing method according to another embodiment of the disclosure;

FIGS. 11A-11B are schematic diagrams of presentation of the object according to some embodiments of the present disclosure;

FIG. 12 is a schematic structural diagram of an image processing apparatus according to an embodiment of the disclosure;

DETAILED DESCRIPTION

Figures 2A, 2B, 2C:
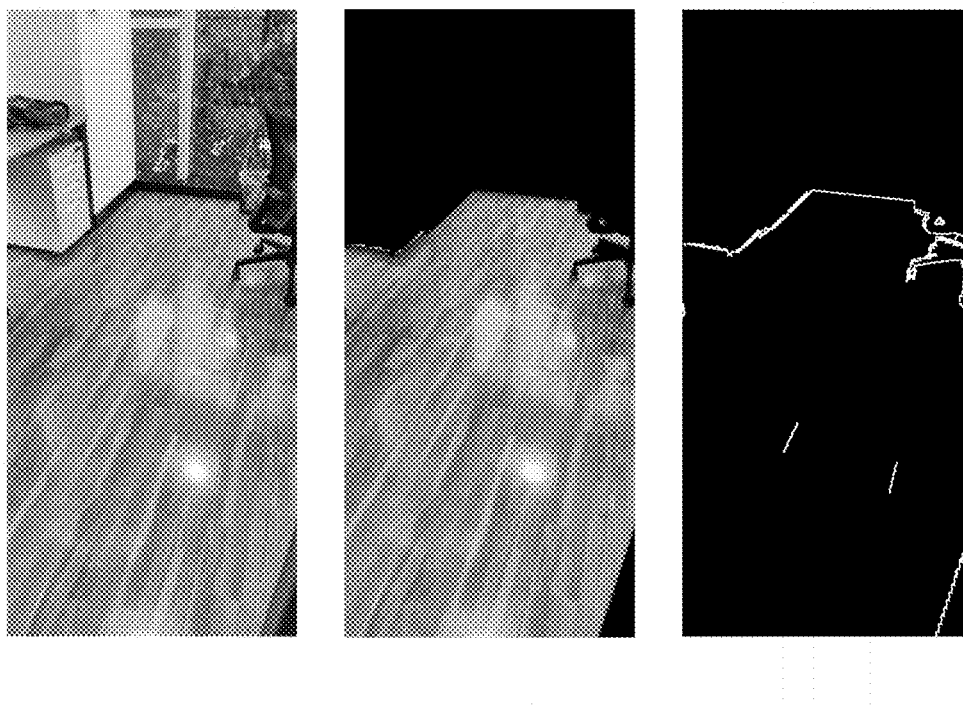
FIGS. 2A-2C are schematic diagrams of extraction of the boundary of an object according to some embodiments of the present disclosure.

The technical solutions in the embodiments of the present disclosure will be described clearly and completely with reference to the drawings in the embodiments of the present disclosure, and it is obvious that the embodiments described are only some embodiments of the present disclosure, rather than all embodiments. The following description of at least one exemplary embodiment is merely illustrative in nature and is in no way intended to limit the disclosure, its application, or uses. All other embodiments, which can be derived by a person skilled in the art from the embodiments disclosed herein without inventive step, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: like reference numbers and letters refer to like items in the following figures, and thus, once an item is defined in one figure, it need not be discussed further in subsequent figures.

The inventors find in the related art, an object such as a floor in a scene image is replaced by means of manual labeling. However, the manual labeling is a huge workload, time-consuming and costly, and cannot meet the individual needs of users.

Accordingly, the image processing scheme provided by the present disclosure can directly replace the object of the scene image with the sample image, thereby effectively meeting the personalized requirements of the user.

FIG. 1 is a schematic flowchart of an image processing method according to one embodiment of the present disclosure. In some embodiments, the following steps of the image processing method are performed by an image processing apparatus.

In step 101, line detection is performed on a boundary of an object in a scene image to obtain a plurality of candidate lines.

For example, in order to process a floor area in an image as shown in FIG. 2A, first, a foreground mask of the floor area is used to extract the floor area in the scene image, and the pixel value of a non-floor area is set to 0 as shown in FIG. 2B. Next, the boundary of the floor area is extracted by using the Canny operator, as shown in FIG. 2C.

Then, Hough line detection is performed on the extracted boundary to obtain a plurality of candidate lines.

In step 102, one of the plurality of the candidate lines, which has the largest number of pixels overlapping with the boundary, is taken as a first reference line.

In step 103, a minimum bounding rectangle of the object is generated in the scene image.

Figure 3:
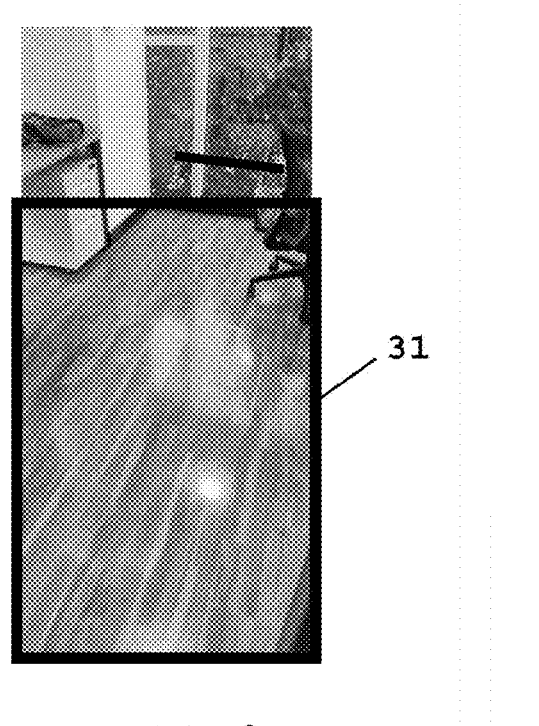
FIG. 3 is a schematic diagram of a minimum bounding rectangle of an object of one embodiment of the present disclosure.

For example, as to the floor of the image shown in FIG. 2A, the minimum bounding rectangle 31 of the floor is shown as a black box in FIG. 3.

At step 104, a transformed area is generated.

It should be noted that each of four vertexes of the minimum bounding rectangle is on one of four sidelines of the transformed area, a slope of a first sideline and a slope of an second sideline opposite to the first sideline of the transformed area are determined by a slope of the first reference line, and a slope of a third sideline and a slope of an fourth sideline opposite to the third sideline of the transformed area are determined by a slope of an exterior angle bisector of the first sideline and the second sideline.

FIG. 4 is a schematic flowchart illustrating an image processing method according to another embodiment of the present disclosure. This embodiment describes the step of generating the transformed area. In some embodiments, the following steps of the image processing method are performed by an image processing apparatus.

In step 401, the first sideline passing through a first vertex of the minimum bounding rectangle and the second sideline passing through a second vertex of the minimum bounding rectangle are generated, wherein an angle where the first vertex is located and an angle where the second vertex is located are opposite angles, a difference between the slope of the first sideline and the slope of the first reference line and a difference between the slope of the second sideline and the slope of the first reference line are within a first preset range.

In some embodiments, the slope of the first sideline is greater than the slope of the first reference line and the slope of the second sideline is less than the slope of the first reference line in a case where the slope of the first reference line is less than 0.

Figure 5:
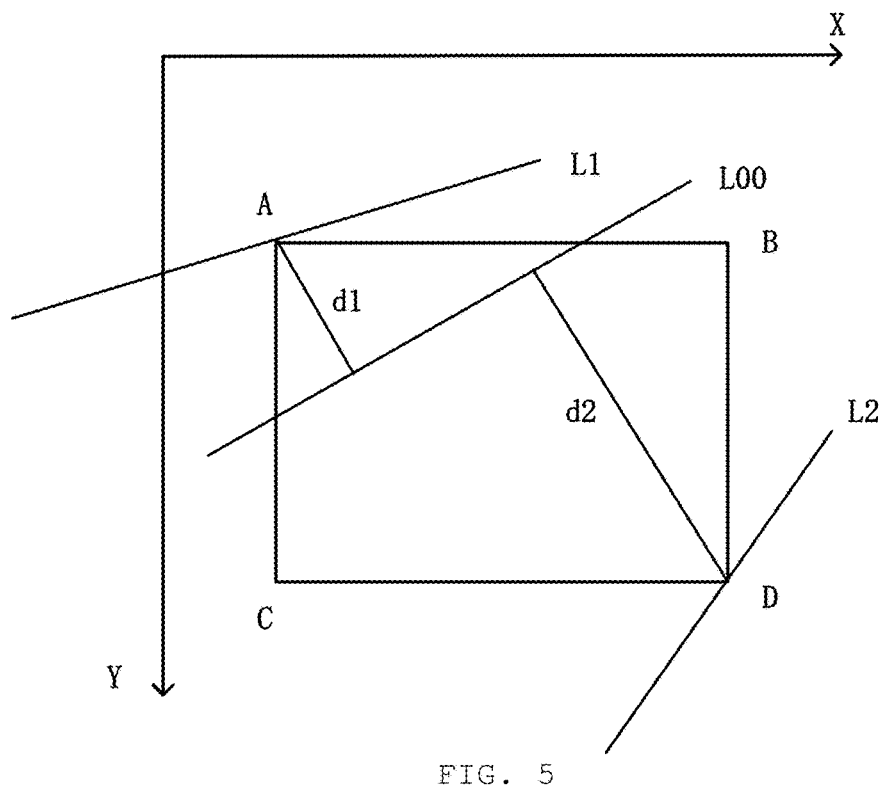
FIGS. 5-8 are schematic diagrams of generation of sidelines of the transformed area according to some embodiments of the present disclosure.

In some embodiments, as shown in FIG. 5, the rectangle ABCD is the minimum bounding rectangle generated, a line L00 is the first reference line, and the slope k* of the line L00 is less than 0, that is, k*<0. In consideration of visual effects, the slope of the first sideline L1 passing through the vertex A and the slope of the second sideline L2 passing through the vertex D do not completely coincide with the slope of the line L00, and there will be some deviation. For example, as shown in FIG. 5, the slope of the first sideline L1 is greater than the slope of the line L00, and the slope of the second sideline L2 is less than the slope of the line L00.

For example, as shown in FIG. 5, the distance from the vertex A to the line L00 is d1, and the distance from the vertex D to the line L00 is d2, then the slope k1 of the first sideline L1 is shown in equation (1), and the slope k2 of the second sideline L2 is shown in equation (2), wherein the parameters N1 and N2 are preset parameters.

$$k1=k*+d1/N1 \tag{1}$$

$$k2=k*-d2/N2 \tag{2}$$

Figure 6:
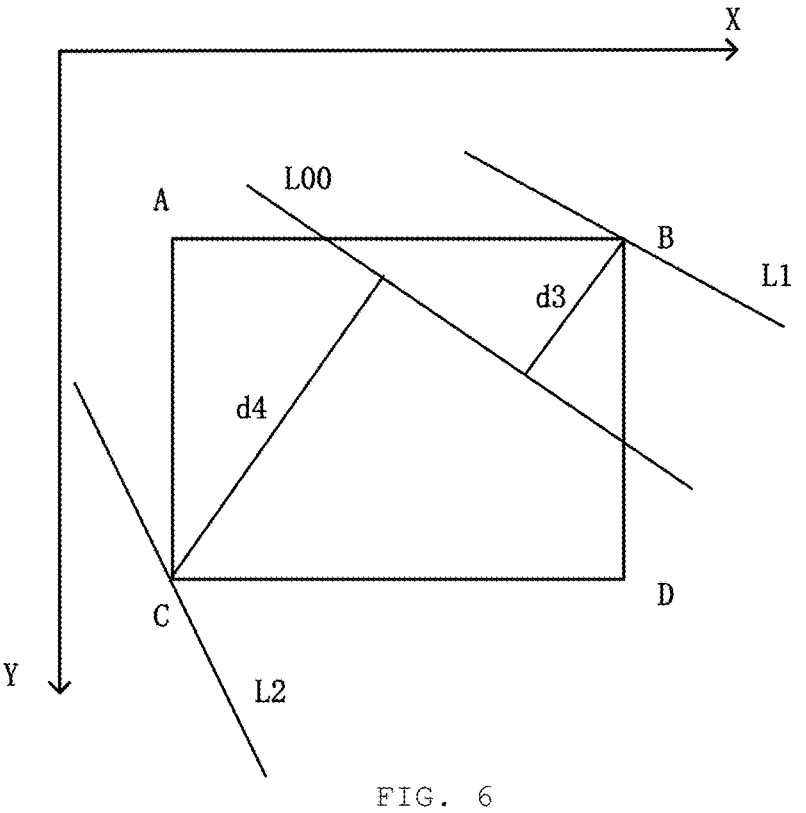

In some embodiments, as shown in FIG. 6, the slope k* of the first reference line L00 is greater than 0, that is, k*>0. In consideration of visual effects, the slope of the first sideline L1 passing through the vertex B and the slop of second sideline L2 passing through the vertex C completely coincide with the slope of the line L00, and there will be some deviation. For example, as shown in FIG. 6, the slope of the first sideline L1 is less than the slope of the line L00, and the slope of the second sideline L2 is greater than the slope of the line L00.

For example, as shown in FIG. 6, the distance from the vertex B to the line L00 is d3, and the distance from the vertex C to the line L00 is d4, then the slope k1 of the first sideline L1 is shown in equation (3), and the slope k2 of the second sideline L2 is shown in equation (4), wherein the parameters N1 and N2 are preset parameters.

$$k1=k*-d3/N1 \tag{3}$$

$$k2=k*+d4/N2 \tag{4}$$

In step 402, a second reference line passing through a center point of the minimum bounding rectangle is generated, wherein a slope of the second reference line is the slope of the external angle bisector of the first sideline and the second sideline.

In step 403, the third sideline passing through a third vertex of the minimum bounding rectangle and the fourth sideline passing through a fourth vertex of the minimum bounding rectangle are generated, wherein an angle where the third vertex is located and an angle where the fourth vertex is located are opposite angles, a difference between the slope of the third sideline and the slope of the second reference line and a difference between the slope of the fourth sideline and the slope of the second reference line are within a second preset range.

In some embodiments, the slope of the third sideline is less than the slope of the second reference line and the slope of the fourth sideline is greater than the slope of the second reference line in a case where the slope of the second reference line is greater than 0.

Figure 7:
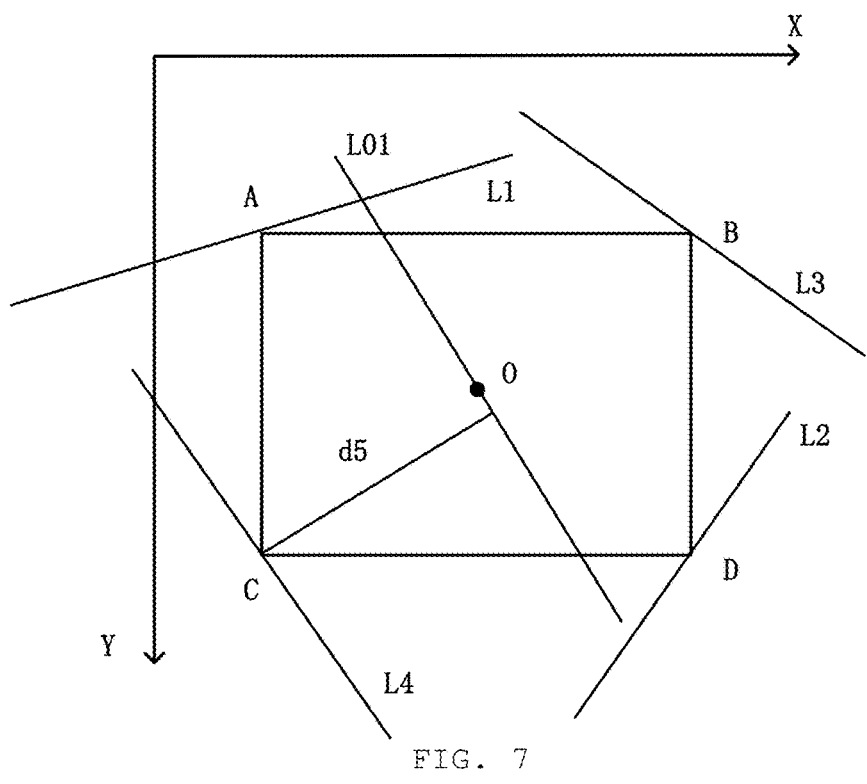

In some embodiments, as shown in FIG. 7, the second reference line L01 passes through the center point O of the rectangle ABCD, and the slope k of the second reference line L01 is greater than 0, that is, k>0. In consideration of the visual effect, the slope of the third line L3 passing through the vertex B and the slope of the fourth line L4 passing through the vertex C do not completely coincide with the slope of the line L01, and there will be some deviation. For example, as shown in FIG. 7, the slope of the third sideline L3 is less than the slope of the line L01, and the slope of the fourth sideline L4 is greater than the slope of the line L01.

For example, as shown in FIG. 7, the distance from the vertex B to the line L01 and the distance from the vertex C to the line L01 are both d5, the slope k3 of the third sideline L3 is shown in equation (5), and the slope k4 of the fourth sideline L4 is shown in equation (6), wherein the parameters N3 and N4 are preset parameters.

$$k3=k**-d5/N3 \tag{5}$$

$$k4=k**+d5/N4 \tag{6}$$

In some embodiments, the slope of the third sideline is greater than the slope of the second reference line and the slope of the fourth sideline is less than the slope of the second reference line in a case where the slope of the second reference line is less than 0.

Figure 8:
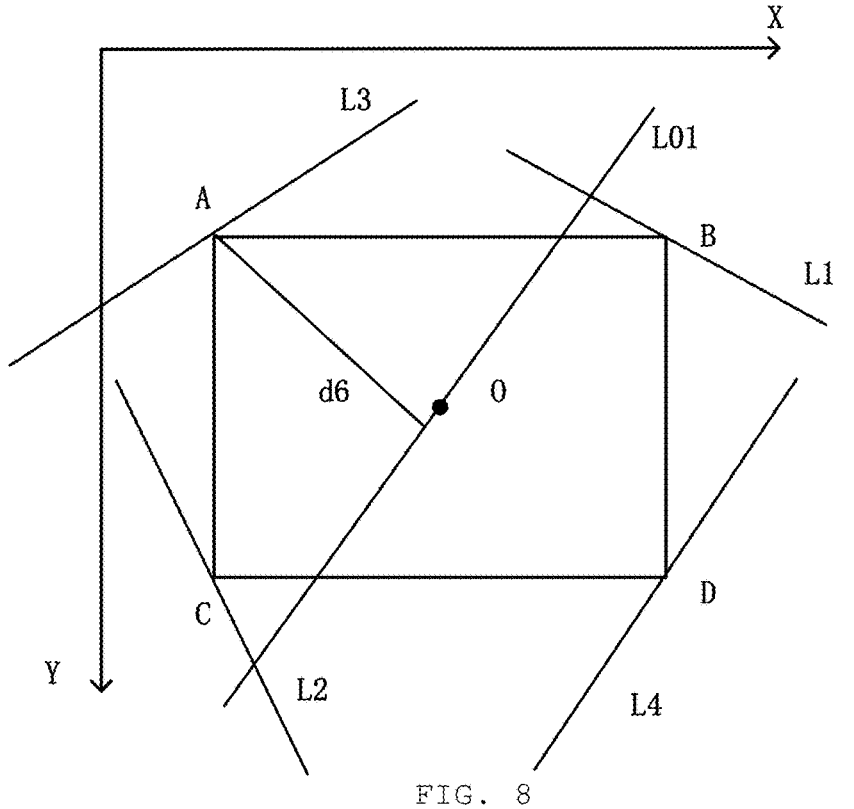

In some embodiments, as shown in FIG. 8, the second reference line L01 passes through the center point O of the rectangle ABCD, and the slope k of the second reference line L01 is less than 0, that is, k<0. In consideration of the visual effect, the slope of the third line L3 passing through the vertex A and the slope of the fourth line L4 passing through the vertex D do not completely coincide with the slope of the line L01, and there will be some deviation. For example, as shown in FIG. 8, the slope of the third sideline L3 is greater than the slope of the line L01, and the slope of the fourth sideline L4 is less than the slope of the line L01.

For example, as shown in FIG. 8, the distance from the vertex A to the line L01 and the distance from the vertex D to the line L01 are both d6, the slope k3 of the third sideline L3 is shown in equation (7), and the slope k4 of the fourth sideline L4 is shown in equation (8), wherein the parameters N3 and N4 are preset parameters.

$$k3=k**+d6/N3 \tag{7}$$

$$k4=k**-d6/N4 \tag{8}$$

At step 404, a transformed area is generated according to the first sideline, the second sideline, the third sideline, and the fourth sideline.

Figure 9:
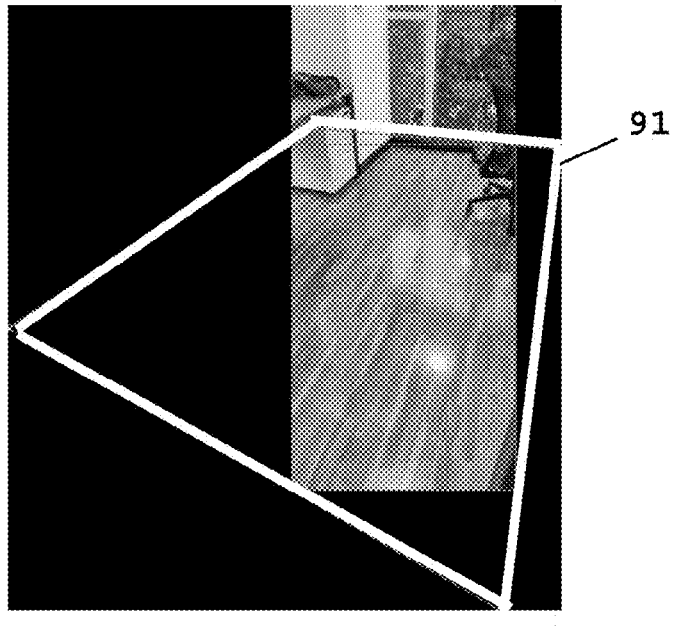
FIG. 9 is a schematic diagram of a transformed area according to one embodiment of the present disclosure.
Figure 10A:
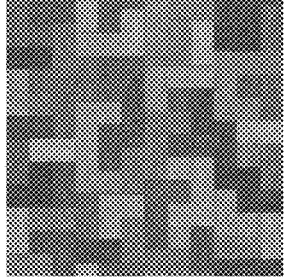
FIGS. 10A-10C are schematic diagrams of image transformation according to some embodiments of the present disclosure.
Figure 10B:
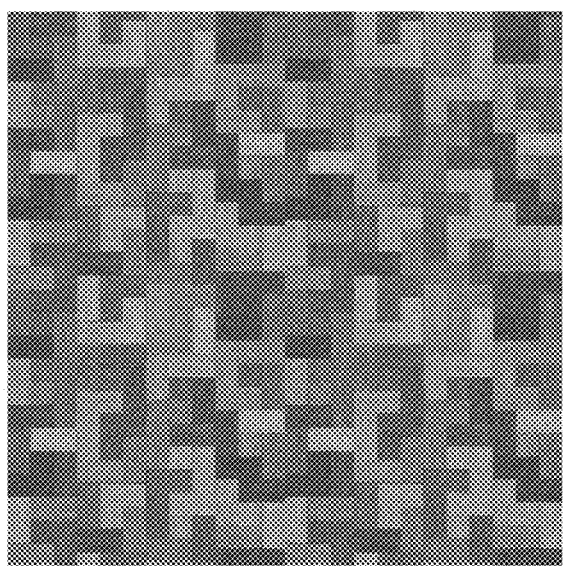
Figure 10C:
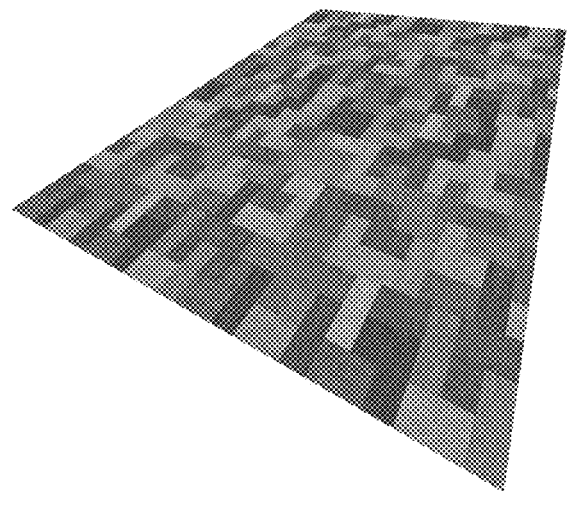

For example, on the basis of FIG. 8, the obtained transformed area 91 is shown as a white-colored box in FIG. 9.

Returning to FIG. 1. In step 105, the preset image is transformed into the transformed area to generate a transformed image.

In some embodiments, a minimum bounding rectangle of the transformed area is generated, the preset image is spliced repeatedly in the minimum bounding rectangle of the transformed area to generate a sample image, and the sample image is transformed into the transformed area by affine transformation to generate a transformed image.

For example, the preset floor image is shown in FIG. 9A. the preset floor image is spliced repeatedly in the minimum bounding rectangle of the transformed area to generate the sample image, as shown in FIG. 9B. Next, the sample image is transformed into the transformed region by affine transformation to generate a transformed image, as shown in FIG. 9C.

In step 106, the object is overlaid with the transformed image to update the scene image.

In some embodiments, portions of the transformed image beyond the scene image are deleted after overlaying the object with the transformed image.

For example, FIG. 11A is an original scene image, the original scene image is overlaid with the transformed image based on the scheme described in the above embodiment, and the floor pattern in the original scene image is changed, as shown in FIG. 11B.

In the image processing method provided by the above embodiments of the present disclosure, the object in the scene image can be directly replaced by the sample image, thereby effectively meeting the personalized requirements of the user.

FIG. 12 is a schematic structural diagram of an image processing apparatus according to an embodiment of the present disclosure. As shown in FIG. 12, the image processing apparatus includes a first processing module 1201, a second processing module 1202, a transformed area generating module 1203, and an image processing module 1204.

The first processing module 1201 is configured to perform line detection on a boundary of an object in a scene image to obtain a plurality of candidate lines, and take one of the plurality of candidate lines, which has the largest number of pixels overlapping with the boundary, as a first reference line.

For example, in order to process a floor area in an image as shown in FIG. 2A, first, a foreground mask of the floor area is used to extract the floor area in the scene image, and the pixel value of a non-floor area is set to 0 as shown in FIG. 2B. Next, the boundary of the floor area is extracted by using the Canny operator, as shown in FIG. 2C.

The second processing module 1202 is configured to generate a minimum bounding rectangle of the object in the scene image.

For example, in the image shown in FIG. 2A, the minimum bounding rectangle 31 of the floor is shown as a black box in FIG. 3.

The transformed area generating module 1203 is configured to generate a transformed area, wherein each of four vertexes of the minimum bounding rectangle is on one of four sidelines of the transformed area, a slope of a first sideline and a slope of an second sideline opposite to the first sideline of the transformed area are determined by a slope of the first reference line, and a slope of a third sideline and a slope of an fourth sideline opposite to the third sideline of the transformed area are determined by a slope of an exterior angle bisector of the first sideline and the second sideline.

In some embodiments, the transformed area generating module 1203 is configured to generate the first sideline passing through a first vertex of the minimum bounding rectangle and the second sideline passing through a second vertex of the minimum bounding rectangle, wherein an angle where the first vertex is located and an angle where the second vertex is located are opposite angles, a difference between the slope of the first sideline and the slope of the first reference line and a difference between the slope of the second sideline and the slope of the first reference line are within a first preset range.

In some embodiments, the slope of the first sideline is greater than the slope of the first reference line and the slope of the second sideline is less than the slope of the first reference line in a case where the slope of the first reference line is less than 0. For example, the slope of the first sideline can be calculated by using the above equation (1), and the slope of the second sideline can be calculated by using the above equation (2).

In some embodiments, the slope of the first sideline is less than the slope of the first reference line and the slope of the second sideline is greater than the slope of the first reference line in a case where the slope of the first reference line is greater than 0. For example, the slope of the first sideline can be calculated by using the above equation (3), and the slope of the second sideline can be calculated by using the above equation (4).

Next, the transformed area generating module 1203 is configured to generate a second reference line passing through a center point of the minimum bounding rectangle, wherein a slope of the second reference line is the slope of the external angle bisector of the first sideline and the second sideline.

Next, the transformed area generating module 1203 is configured to generate the third sideline passing through a third vertex of the minimum bounding rectangle and the fourth sideline passing through a fourth vertex of the minimum bounding rectangle, wherein an angle where the third vertex is located and an angle where the fourth vertex is located are opposite angles, a difference between the slope of the third sideline and the slope of the second reference line and a difference between the slope of the fourth sideline and the slope of the second reference line are within a second preset range.

In some embodiments, the slope of the third sideline is less than the slope of the second reference line and the slope of the fourth sideline is greater than the slope of the second reference line in a case where the slope of the second reference line is greater than 0. For example, the slope of the third sideline may be calculated by the above equation (5), and the slope of the fourth sideline may be calculated by the above equation (6).

In some embodiments, the slope of the third sideline is greater than the slope of the second reference line and the slope of the fourth sideline is less than the slope of the second reference line in a case where the slope of the second reference line is less than 0. For example, the slope of the third sideline may be calculated by the above equation (7), and the slope of the fourth sideline may be calculated by the above equation (8).

Then, the transformed area generating module 1203 is configured to generate the transformed area according to the first sideline, the second sideline, the third sideline and the fourth sideline. For example, on the basis of FIG. 8, the resulting transformed region 91 is shown as a white-colored box in FIG. 9.

The image processing module 1204 is configured to transform a preset image into the transformed area to generate a transformed image, and overlay the object with the transformed image to update the scene image.

In some embodiments, the image processing module 1204 is configured to generate a minimum bounding rectangle of the transformed area, splice repeatedly the preset image in the minimum bounding rectangle of the transformed area to generate a sample image, and transform the sample image into the transformed area by affine transformation to generate a transformed image.

Figure 13:
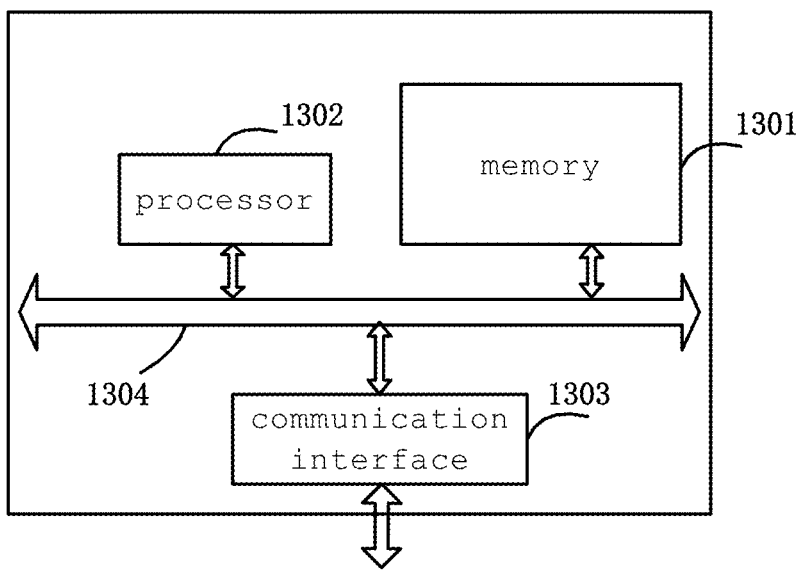
FIG. 13 is a schematic structural diagram of an image processing apparatus according to another embodiment of the present disclosure.

FIG. 13 is a schematic structural diagram of an image processing apparatus according to another embodiment of the present disclosure. As shown in FIG. 13, the image processing apparatus includes a memory 1301 and a processor 1302.

The memory 1301 is used for storing instructions, the processor 1302 is coupled to the memory 1301, and the processor 1302 is configured to perform the method according to any of the embodiments in FIG. 1 or FIG. 4 based on the instructions stored in the memory.

As shown in FIG. 13, the image processing apparatus further includes a communication interface 1303 for exchanging information with other devices. Meanwhile, the image processing apparatus further includes a bus 1304 through which the processor 1302, the communication interface 1303, and the memory 1301 complete communication with each other.

Memory 1301 may include high speed RAM memory, and may also include non-volatile memory, such as at least one disk memory. The memory 1301 may also be a memory array. The memory 1301 may also be partitioned into blocks, and the blocks may be combined into virtual volumes according to certain rules.

Further, processor 1302 may be a central processing unit CPU, or may be an application specific integrated circuit ASIC, or one or more integrated circuits configured to implement embodiments of the present disclosure.

The present disclosure also relates to a non-transitory computer-readable storage medium storing computer instructions which, when executed by a processor, implement the method according to any one of the embodiments in FIG. 1 or FIG. 4.

In some embodiments, the functional unit modules described above can be implemented as a general purpose processor, a programmable logic controller (PLC), a digital signal processor (DSP), an application specific integrated circuit (ASIC), a field programmable gate array (FPGA) or other programmable logic devices, discrete gates or transistor logics, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium which may be a read-only memory, a magnetic disk or an optical disk.

The description of the present disclosure has been presented for purposes of illustration and description, and is not intended to be exhaustive or limited to the disclosure in the form disclosed. Many modifications and variations will be apparent to practitioners skilled in this art. The embodiments were chosen and described in order to best explain the principles of the disclosure and the practical application, and to enable those of ordinary skill in the art to understand the disclosure for various embodiments with various modifications as are suited to the particular use contemplated.

What is claimed is:

1. An image processing method, comprising:

performing line detection on a boundary of an object in a scene image to obtain a plurality of candidate lines;

taking one of the plurality of the candidate lines, which has the largest number of pixels overlapping with the boundary, as a first reference line;

generating a minimum bounding rectangle of the object in the scene image;

generating a transformed area, wherein each of four vertexes of the minimum bounding rectangle is on one of four sidelines of the transformed area, a slope of a first sideline and a slope of a second sideline opposite to the first sideline of the transformed area are determined by a slope of the first reference line, and a slope of a third sideline and a slope of a fourth sideline opposite to the third sideline of the transformed area are determined by a slope of an exterior angle bisector of the first sideline and the second sideline, wherein the generating the transformed area comprises:

generating the first sideline passing through a first vertex of the minimum bounding rectangle and the second sideline passing through a second vertex of the minimum bounding rectangle, wherein an angle where the first vertex is located and an angle where the second vertex is located are opposite angles, a difference between the slope of the first sideline and the slope of the first reference line and a difference between the slope of the second sideline and the slope of the first reference line are within a first preset range;

generating a second reference line passing through a center point of the minimum bounding rectangle, wherein a slope of the second reference line is the slope of the external angle bisector of the first sideline and the second sideline;

generating the third sideline passing through a third vertex of the minimum bounding rectangle and the fourth sideline passing through a fourth vertex of the minimum bounding rectangle, wherein an angle where the third vertex is located and an angle where the fourth vertex is located are opposite angles, a difference between the slope of the third sideline and the slope of the second reference line and a difference between the slope of the fourth sideline and the slope of the second reference line are within a second preset range; and generating the transformed area according to the first sideline, the second sideline, the third sideline and the fourth sideline;

transforming a preset image into the transformed area to generate a transformed image; and overlaying the object with the transformed image to update the scene image.

2. The image processing method according to claim 1, wherein the slope of the first sideline is greater than the slope of the first reference line and the slope of the second sideline is less than the slope of the first reference line in a case where the slope of the first reference line is less than 0.

3. The image processing method according to claim 2, wherein the slope of the first sideline is less than the slope of the first reference line and the slope of the second sideline is greater than the slope of the first reference line in a case where the slope of the first reference line is greater than 0.

4. The image processing method according to claim 3, wherein:

the difference between the slope of the first sideline and the slope of the first reference line is a ratio of a distance from the first vertex to the first reference line to a first preset parameter; and the difference between the slope of the second sideline and the slope of the first reference line is a ratio of a distance from the second vertex to the first reference line to a second preset parameter.

5. The image processing method according to claim 4, wherein the slope of the third sideline is less than the slope of the second reference line and the slope of the fourth sideline is greater than the slope of the second reference line in a case where the slope of the second reference line is greater than 0.

6. The image processing method according to claim 5, wherein the slope of the third sideline is greater than the slope of the second reference line and the slope of the fourth sideline is less than the slope of the second reference line in a case where the slope of the second reference line is less than 0.

7. The image processing method according to claim 6, wherein:

the difference between the slope of the third sideline and the slope of the second reference line is a ratio of a distance from the third vertex to the second reference line to a third preset parameter; and the difference between the slope of the fourth sideline and the slope of the second reference line is a ratio of a distance from the fourth vertex to the second reference line to a fourth preset parameter.

8. The image processing method according to claim 1, wherein the transforming a preset image into the transformed area to generate a transformed image comprises:

generating a minimum bounding rectangle of the transformed area;

splicing repeatedly the preset image in the minimum bounding rectangle of the transformed area to generate a sample image; and transforming the sample image into the transformed area by affine transformation to generate a transformed image.

9. The image processing method according to claim 1, further comprising:

deleting portions of the transformed image beyond the scene image after overlaying the object with the transformed image.

10. An image processing apparatus, comprising:

a memory; and a processor coupled to the memory, which is configured to execute the image processing method comprising:

performing line detection on a boundary of an object in a scene image to obtain a plurality of candidate lines;

taking one of the plurality of the candidate lines, which has the largest number of pixels overlapping with the boundary, as a first reference line;

generating a minimum bounding rectangle of the object in the scene image;

generating a transformed area, wherein each of four vertexes of the minimum bounding rectangle is on one of four sidelines of the transformed area, a slope of a first sideline and a slope of a second sideline opposite to the first sideline of the transformed area are determined by a slope of the first reference line, and a slope of a third sideline and a slope of a fourth sideline opposite to the third sideline of the transformed area are determined by a slope of an exterior angle bisector of the first sideline and the second sideline, wherein the generating the transformed area comprises:

generating the first sideline passing through a first vertex of the minimum bounding rectangle and the second sideline passing through a second vertex of the minimum bounding rectangle, wherein an angle where the first vertex is located and an angle where the second vertex is located are opposite angles, a difference between the slope of the first sideline and the slope of the first reference line and a difference between the slope of the second sideline and the slope of the first reference line are within a first preset range;

generating a second reference line passing through a center point of the minimum bounding rectangle, wherein a slope of the second reference line is the slope of the external angle bisector of the first sideline and the second sideline;

generating the third sideline passing through a third vertex of the minimum bounding rectangle and the fourth sideline passing through a fourth vertex of the minimum bounding rectangle, wherein an angle where the third vertex is located and an angle where the fourth vertex is located are opposite angles, a difference between the slope of the third sideline and the slope of the second reference line and a difference between the slope of the fourth sideline and the slope of the second reference line are within a second preset range; and generating the transformed area according to the first sideline, the second sideline, the third sideline and the fourth sideline;

transforming a preset image into the transformed area to generate a transformed image; and overlaying the object with the transformed image to update the scene image.

11. The image processing apparatus according to claim 10, wherein the slope of the first sideline is greater than the slope of the first reference line and the slope of the second sideline is less than the slope of the first reference line in a case where the slope of the first reference line is less than 0.

12. The image processing apparatus according to claim 11, wherein the slope of the first sideline is less than the slope of the first reference line and the slope of the second sideline is greater than the slope of the first reference line in a case where the slope of the first reference line is greater than 0.

13. The image processing apparatus according to claim 12, wherein:

the difference between the slope of the first sideline and the slope of the first reference line is a ratio of a distance from the first vertex to the first reference line to a first preset parameter; and the difference between the slope of the second sideline and the slope of the first reference line is a ratio of a distance from the second vertex to the first reference line to a second preset parameter.

14. The image processing apparatus according to claim 13, wherein the slope of the third sideline is less than the slope of the second reference line and the slope of the fourth sideline is greater than the slope of the second reference line in a case where the slope of the second reference line is greater than 0.

15. The image processing apparatus according to claim 14, wherein the slope of the third sideline is greater than the slope of the second reference line and the slope of the fourth sideline is less than the slope of the second reference line in a case where the slope of the second reference line is less than 0.

16. The image processing apparatus according to claim 15, wherein:

the difference between the slope of the third sideline and the slope of the second reference line is a ratio of a distance from the third vertex to the second reference line to a third preset parameter; and the difference between the slope of the fourth sideline and the slope of the second reference line is a ratio of a distance from the fourth vertex to the second reference line to a fourth preset parameter.

17. The image processing apparatus according to claim 10, wherein the transforming a preset image into the transformed area to generate a transformed image comprises:

generating a minimum bounding rectangle of the transformed area;

splicing repeatedly the preset image in the minimum bounding rectangle of the transformed area to generate a sample image; and transforming the sample image into the transformed area by affine transformation to generate a transformed image.

18. A non-transitory computer readable storage medium which stores computer instructions that, when executed by a processor, implement the image processing method comprising:

performing line detection on a boundary of an object in a scene image to obtain a plurality of candidate lines;

taking one of the plurality of the candidate lines, which has the largest number of pixels overlapping with the boundary, as a first reference line;

generating a minimum bounding rectangle of the object in the scene image;

generating a transformed area, wherein each of four vertexes of the minimum bounding rectangle is on one of four sidelines of the transformed area, a slope of a first sideline and a slope of a second sideline opposite to the first sideline of the transformed area are determined by a slope of the first reference line, and a slope of a third sideline and a slope of a fourth sideline opposite to the third sideline of the transformed area are determined by a slope of an exterior angle bisector of the first sideline and the second sideline, wherein the generating the transformed area comprises:

generating the first sideline passing through a first vertex of the minimum bounding rectangle and the second sideline passing through a second vertex of the minimum bounding rectangle, wherein an angle where the first vertex is located and an angle where the second vertex is located are opposite angles, a difference between the slope of the first sideline and the slope of the first reference line and a difference between the slope of the second sideline and the slope of the first reference line are within a first preset range;

generating a second reference line passing through a center point of the minimum bounding rectangle, wherein a slope of the second reference line is the slope of the external angle bisector of the first sideline and the second sideline;

generating the third sideline passing through a third vertex of the minimum bounding rectangle and the fourth sideline passing through a fourth vertex of the minimum bounding rectangle, wherein an angle where the third vertex is located and an angle where the fourth vertex is located are opposite angles, a difference between the slope of the third sideline and the slope of the second reference line and a difference between the slope of the fourth sideline and the slope of the second reference line are within a second preset range; and generating the transformed area according to the first sideline, the second sideline, the third sideline and the fourth sideline;

transforming a preset image into the transformed area to generate a transformed image; and overlaying the object with the transformed image to update the scene image.

* * * * *